SYSTEM FOR OPTICALLY DETERMINING CURVATURE OF AN OBJECT

Filed July 1, 1960 6 Sheets-Sheet 1

INVENTORS
CLYDE W. HARRIS
PAUL S. SUGINO
ROBERT S. NEISWANDER
BY Lyon & Lyon
ATTORNEYS

SYSTEM FOR OPTICALLY DETERMINING CURVATURE OF AN OBJECT

Filed July 1, 1960 6 Sheets-Sheet 2

INVENTORS
CLYDE W. HARRIS
PAUL S. SUGINO
ROBERT S. NEISWANDER

BY Lyon & Lyon
ATTORNEYS

INVENTORS
CLYDE W. HARRIS
PAUL S. SUGINO
ROBERT S. NEISWANDER

BY Lyon & Lyon
ATTORNEYS

SYSTEM FOR OPTICALLY DETERMINING CURVATURE OF AN OBJECT

Filed July 1, 1960 6 Sheets-Sheet 4

INVENTORS
CLYDE W. HARRIS
PAUL S. SUGINO
ROBERT S. NEISWANDER
BY
ATTORNEYS

SYSTEM FOR OPTICALLY DETERMINING CURVATURE OF AN OBJECT

Filed July 1, 1960 6 Sheets-Sheet 5

INVENTORS
CLYDE W. HARRIS
PAUL S. SUGINO
ROBERT S. NEISWANDER
BY Lyon & Lyon
ATTORNEYS INVENTORS
CLYDE W. HARRIS
PAUL S. SUGINO
ROBERT S. NEISWANDER
BY Lyon & Lyon
ATTORNEYS United States Patent Office 3,183,519
Patented May 11, 1965

3,183,519

SYSTEM FOR OPTICALLY DETERMINING CURVATURE OF AN OBJECT

Clyde W. Harris, Goleta, and Paul S. Sugino and Robert S. Neiswander, Santa Barbara, Calif., assignors to The TE Company, Santa Barbara, Calif., a corporation of California Filed July 1, 1960, Ser. No. 40,302
17 Claims. (Cl. 351—17)

The present invention relates to means and techniques for measuring or determining the radius of curvature of either concave or convex objects and has particular usefulness in the measurement or determination of radii of different points on the human cornea so as to provide a prescription for contact lenses or corneal lenses and for the testing or checking of contact lenses made in accordance with the prescription.

Briefly, the apparatus disclosed herein has particular applicability to measurement or determination of local radii of curvatures of the human cornea. This is done by apparatus which is essentially optical in nature without physical contact with the eye. Essentially, a total of ten local radii are determined, five of which are on one meridian and the other five of which are on a second meridian perpendicular to the first-mentioned meridian. For this purpose the optical system is rotatable through at least 90° to effect a first series of five measurements, after which the optical system is rotated 90° to effect the second series of five measurements. Also for these purposes the optical system includes five orientation lamps which are successively energized and on which the patient successively focuses to orient his eye for each series of five measurements. These orientation lamps are so arranged that the point of measurement of radii is spaced approximately 2.5 mm. apart.

One of the unique features of the present invention is the particular optical system by which local radii measurements are made.

Another unique feature of the present invention involves the particular manner in which the radius determined by the optical system is read out. This arrangement generally is in the form of a digital computer which incorporates both optical and electrical means.

It is therefore a general object of the present invention to provide improved means and techniques for accomplishing the results indicated above.

Another object of the present invention is to provide a system of this character which allows one to provide a prescription for contact lenses and one which, through slight modification, may be used to check the contact lens made in accordance with the prescription.

Another object of the present invention is to provide a system of this character in which the radii measurements are made quickly and accurately without discomfort to the patient.

Another object of the present invention is to provide a system of this character which may be used by relatively unskilled operators.

Another object of the present invention is to provide a system of this character in which radius measurements or determinations are read out directly without the requirement for any computation or for awaiting the results of exposures made on films.

Another object of the present invention is to provide a novel optical system for accomplishing the above results.

Another object of the present invention is to provide a novel read-out system wherein different geometrical conditions established optically are read out electrically.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 21, 22, 24:
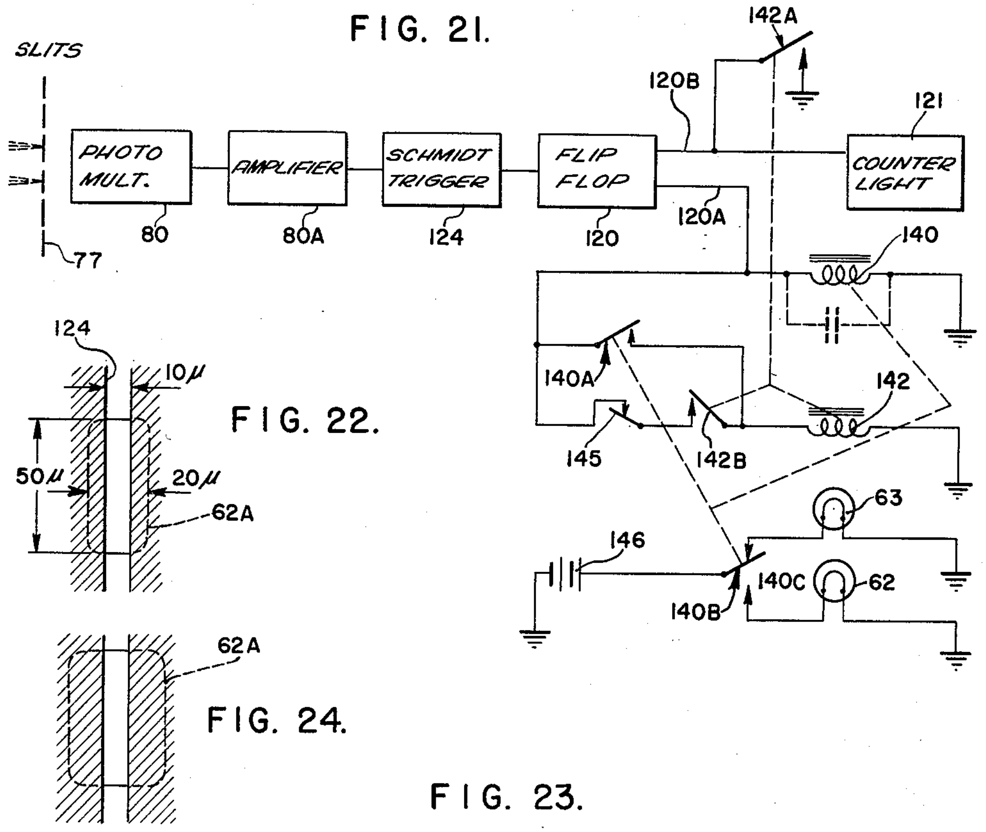
FIGURE 21 illustrates in more detail electrical circuitry used in the counter circuit.

FIGURES 22–25 both inclusive illustrate the focusing feature of the invention, FIGURES 22 and 24 representing respectively the size of a focused and unfocused image with respect to one of the slits, and corresponding FIGURES 23, 23A and 25, 25A representing the corresponding voltages produced by the focused and unfocused images.

Figure 26A:
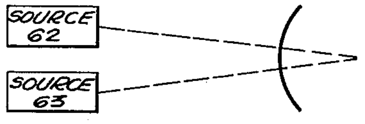
Figure 26B:
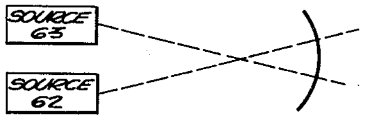

FIGURES 26 and 26A represent an exaggerated form of the optical system used in making radii measurements on convex and concave objects.

Figure 1:
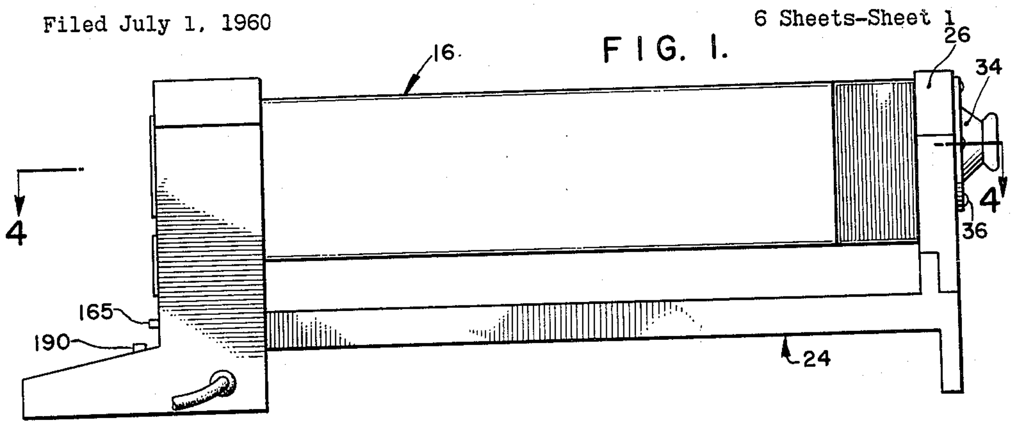
FIGURES 1 and 2 are views in side elevation and in plane respectively of apparatus embodying features of the present invention.
Figure 11:
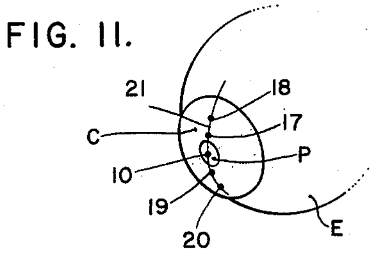
FIGURES 11 and 12 illustrate generally the cornea of the human eye and also indicate the particular points on the corneal lens at which the ten radii measurements are made.
Figure 12:
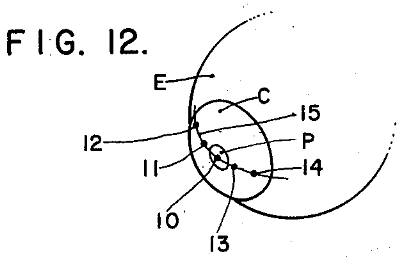

Referring to the drawings, FIGURES 11 and 12 illustrate generally the human eye E, its corneal lens C and pupil P. The points 10 in FIGURES 11 and 12 correspond to the corneal apex and indicate one point at which radii measurements are made. The other points 11, 12, 13, 14 lying on the same meridian line 15 as point 10 in FIGURE 12 are spaced approximately 2.5 mm. apart and serve to indicate other points at which radii measurements are made, it being noted that points 11 and 13 are each spaced 2.5 mm. from the apex along the meridian line and points 12 and 14 are each spaced 5 mm. from the apex. A set of radii measurements at points 10, 11, 12, 13 and 14 in FIGURE 12 are made with one positioning of the optical chamber 16 (FIGURES 1–3), after which the optical chamber 16 is rotated through 90° to obtain a second set of radii measurements at points 10, 17, 18, 19 and 20 also spaced approximately 2.5 mm. apart in FIGURE 11 along the vertical meridian line 21. These two sets of measurements, totaling ten in number, provide sufficient information for a prescription for a contact lens fitting the cornea.

For these purposes the optical system for effecting such measurements is mounted in the optical chamber 16 in the general form of a light-tight, rectangularly-shaped box having circular end portions 16A and 16B thereof journalled for rotation on a stationary base member 24 which has upwardly extending bracket portions 25 and 26. The bracket portion 25 may be integrally formed with the base portion 24 and is circularly apertured to receive the bearing member 28 and the reduced diameter portion 16A of optical chamber 16. The other bracket member 26, for ease of assembly, may be in the form of a plate, bolted to the base member 24 by bolts 30 and is formed with a circular grooved portion 31 to receive the bearing member 32 and the reduced diameter portion 16B of optical chamber 16. This plate 26 is also circularly apertured to receive the stationary eyepiece 34 which is fastened by screws 36 to plate 26. By these means the optical chamber or box 16 may be rotated to obtain the two sets of measurements along the two perpendicular meridian lines 15 and 21 in FIGURES 11 and 12. For purposes of the immediate discussion, the optical chamber may be considered to be stationary, in the position illustrated in the drawings for obtaining the series of five measurements at points indicated in FIGURE 12.

Figure 4:
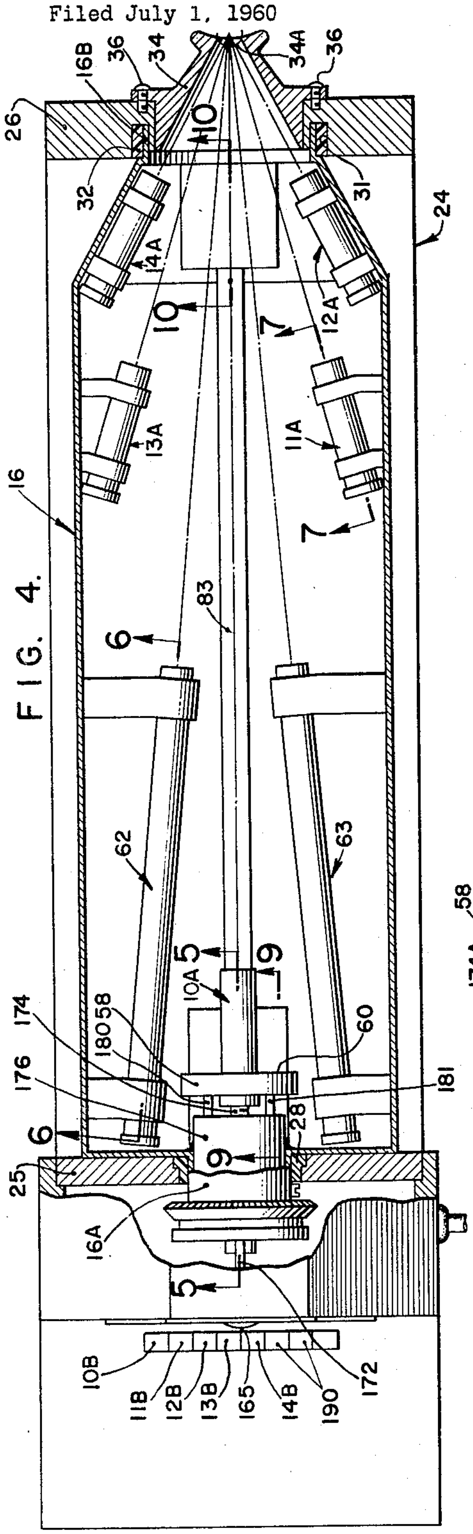
FIGURE 4 is a view taken generally along the line 4—4 in FIGURE 1.

To properly orient the patient's eye, there is provided, as shown in FIGURE 4, five fixation or orientation light cells 10A, 11A, 12A, 13A and 14A corresponding respectively to measuring points 10, 11, 12, 13 and 14 in FIGURE 12 which are successively energized in that order in the course of making the five measurements. These light sources may emit a characteristic color illumination so that instructions may be given to the patient to direct his eye towards such characteristic color light. The different angularly offset light sources 11A, 12A, 13A and 14A are all of the same construction as exemplified for each in FIGURE 7, while the other central light source 10A shown in FIGURE 5 is of somewhat different construction but for the same purpose, i.e. to obtain the proper orientation of the patient's eye.

Figures 5, 6, 7:
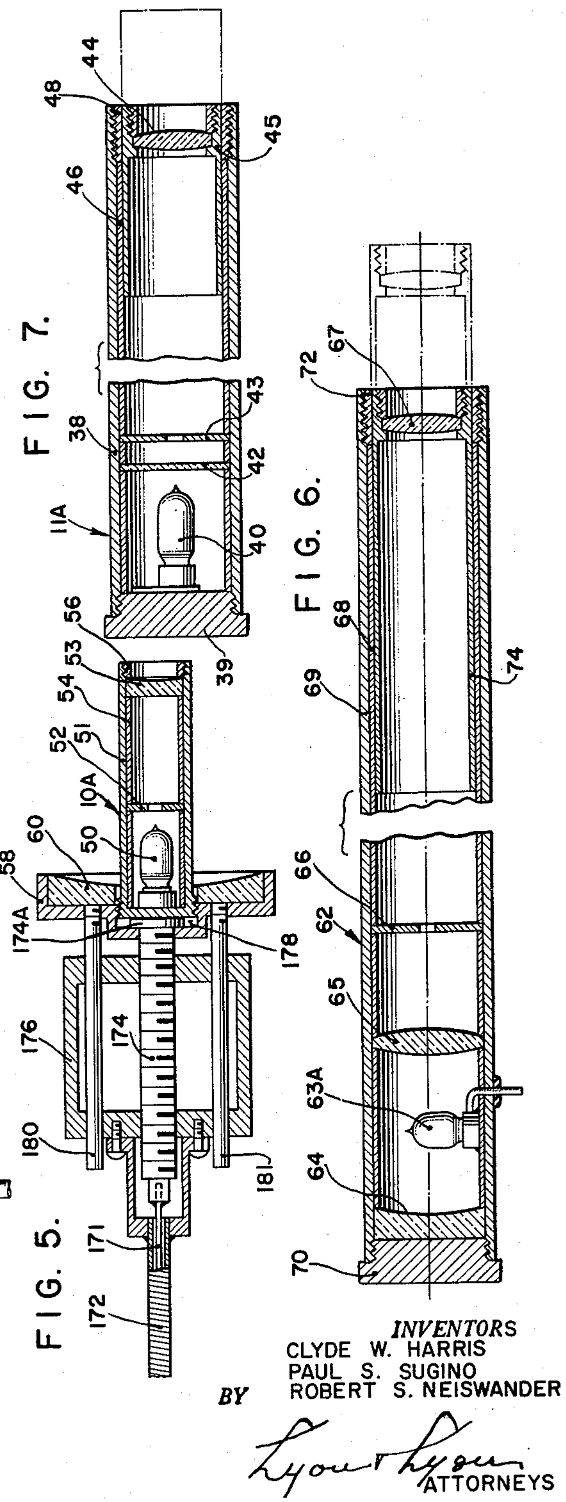
FIGURE 5 is a sectional view taken generally in the direction indicated by the lines 5—5 in both FIGURES 4 and 8 and illustrates details of the centrally disposed spherical reflecting mirror and one of the orientation cells together with the focusing means for the apparatus.
FIGURE 6 is a sectional view taken generally along the line 6—6 of FIGURE 4 and serves to illustrate details of the two identical image-forming slit systems used in providing that light which is reflected from the corneal lens for establishing radii measurements.
FIGURE 7 is a sectional view taken generally along the line 7—7 of FIGURE 4 and serves to illustrate the structural details of the four other orientation light sources.

These fixation or orientation light sources may be of simple construction involving, as shown in FIGURE 7, a tube 38 having threaded therein a base 39 carrying a flashlight-type lamp bulb 40, a cellophane or glass red diffuser filter disc 42, a stop 43 with a 1 by 5 mm. slit, and an ophthalmic quality plastic lens 44 mounted in a tube 45 which is slidably mounted in the multisection liner 46, the liner 46 being maintained in tube 38 between the base 39 and the ring 48 threaded in tube 38.

The other orientation light source 10A may be similarly constructed as shown in FIGURE 5, but in this case the construction preferably involves a half-silvered window producing multiple reflections for more accurate alignment. A flashlight-type lamp bulb 50 is mounted on the base of tube 51 in alignment with a light stop 52 having its front surface silvered and a round window 53 having its back surface half silvered, the stop 52 and window 53 being maintained spaced by the multisection liner 54 which in turn is retained by the ring 56 threaded in tube 51. By half-silvering the back side of the window 53 and silvering the front face of the stop 52, multiple reflections are set up. The patient sees a line of images fading off and can align his eye with the optical axis by aligning the images.

While the four light sources 11A, 12A, 13A and 14A are fixedly mounted in proper alignment on inner adjacent side walls of the optical chamber or box 16 by suitable brackets, the other or central light source 10A is mounted on an adjustable carriage 58 which also carries a spherical mirror 60 for purposes described later.

Figure 8:
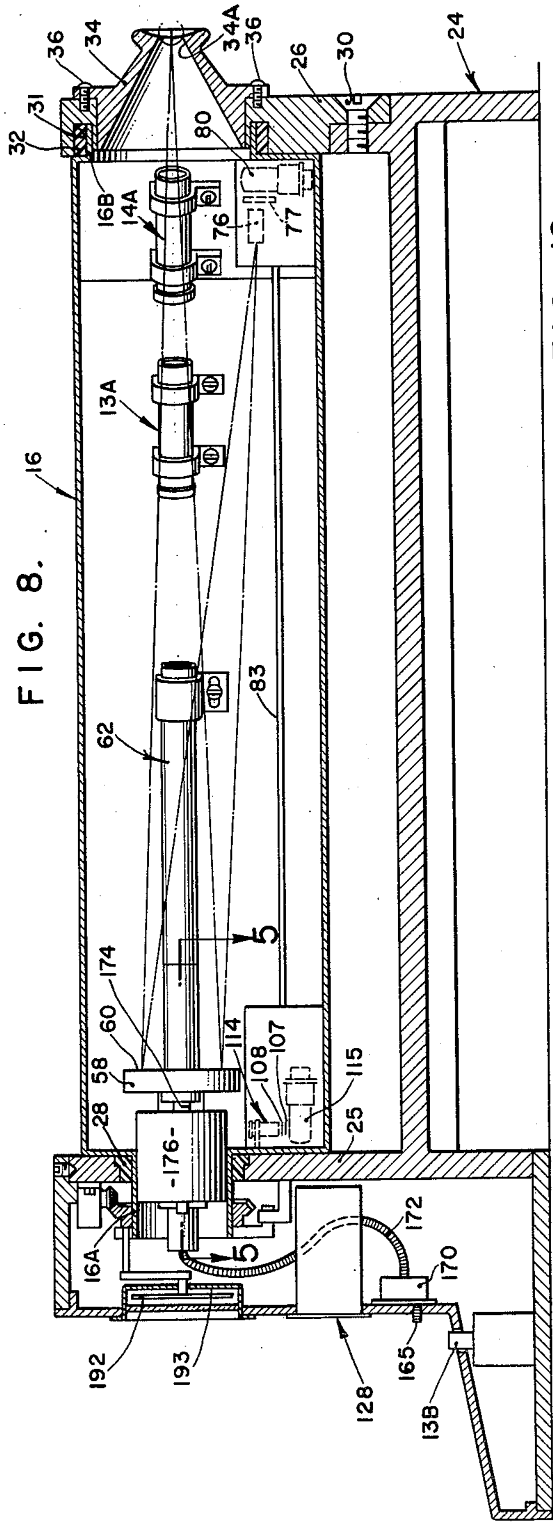
FIGURE 8 is a sectional view taken generally along the line 8—8 in FIGURE 2.
Figure 10:
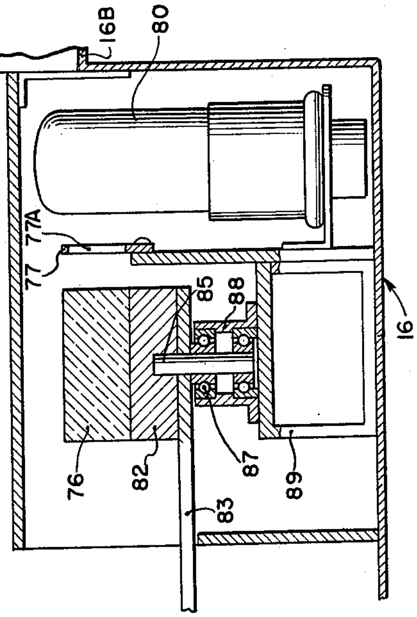
FIGURE 10 is a sectional view taken generally along the line 10—10 in FIGURE 4.
Figures 13, 14, 15, 16:
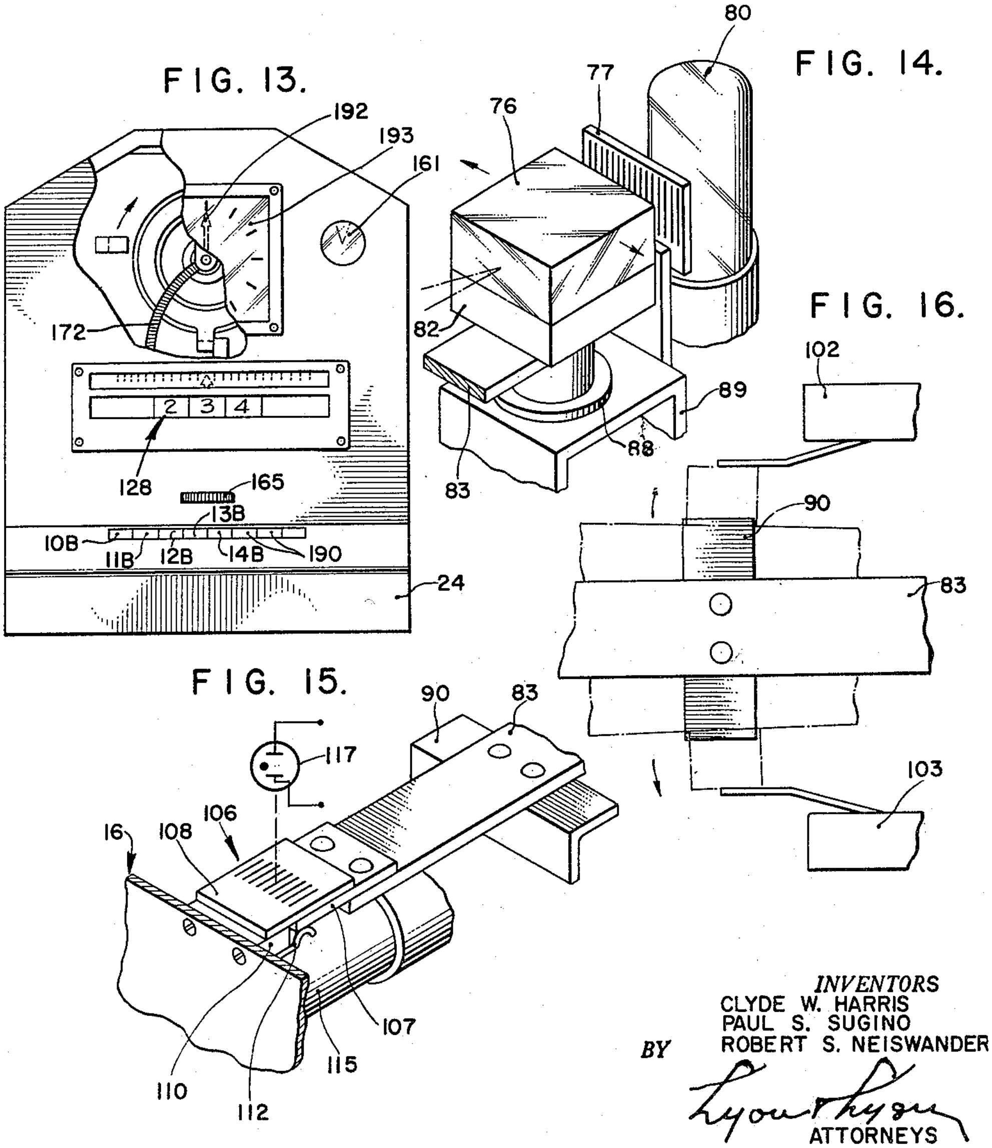
FIGURE 13 is a view of the front of the apparatus corresponding generally to FIGURE 3 but with parts broken away to show internal construction.
FIGURE 14 is a perspective view of some of the apparatus shown in FIGURE 10.
FIGURE 15 is a perspective view illustrating some of the apparatus shown in FIGURE 9.
FIGURE 16 illustrates location of limit switches with respect to the oscillating wand.

A pair of image-forming light sources 62 and 63 (FIGURE 4) are also fixedly mounted on opposite side walls of optical chamber 16 for projecting images to the central portion of the apertured portion 34A of eyepiece 34; and the light produced by these sources 62 and 63 is reflected from the cornea and used to achieve the actual radii measurements. Each of these sources 62 and 63 is constructed as exemplified in FIGURE 6 wherein a flashlight-type bulb 63A is maintained between and in optical alignment with the mirror 64, condenser lens 65 and a fixed light stop 66 is positioned between lens 65 and an adjustably positioned condenser lens 67. A multisection liner 68, retained within tube 69 by plug 70 and ring 72 each threaded in tube 69, serves to maintain the mirror 64, condenser or convergence lens 65 and stop 66 and also to form a bearing support for the inner adjustable light tube 74 in which the lens 67 is mounted. These two light sources 62 and 63 are alternately energized automatically in operation of the system as described later. Light from either of these two sources 62 and 63, after reflection from the cornea, impinges on the above-mentioned centrally disposed spherical mirror 60 from where it is in turn reflected onto an oscillating prism 76 (FIGURES 8 and 10) which serves to correspondingly move the reflected image produced by the 1 mm. by 5 mm. slit in light stop 66 (FIGURE 6) over a stationary slit system 77 which is interposed between prism 76 and a photocell 80 (FIGURES 8, 10 and 14). The photocell 80 accordingly performs control functions as described later.

Figures 17, 18, 19, 20:
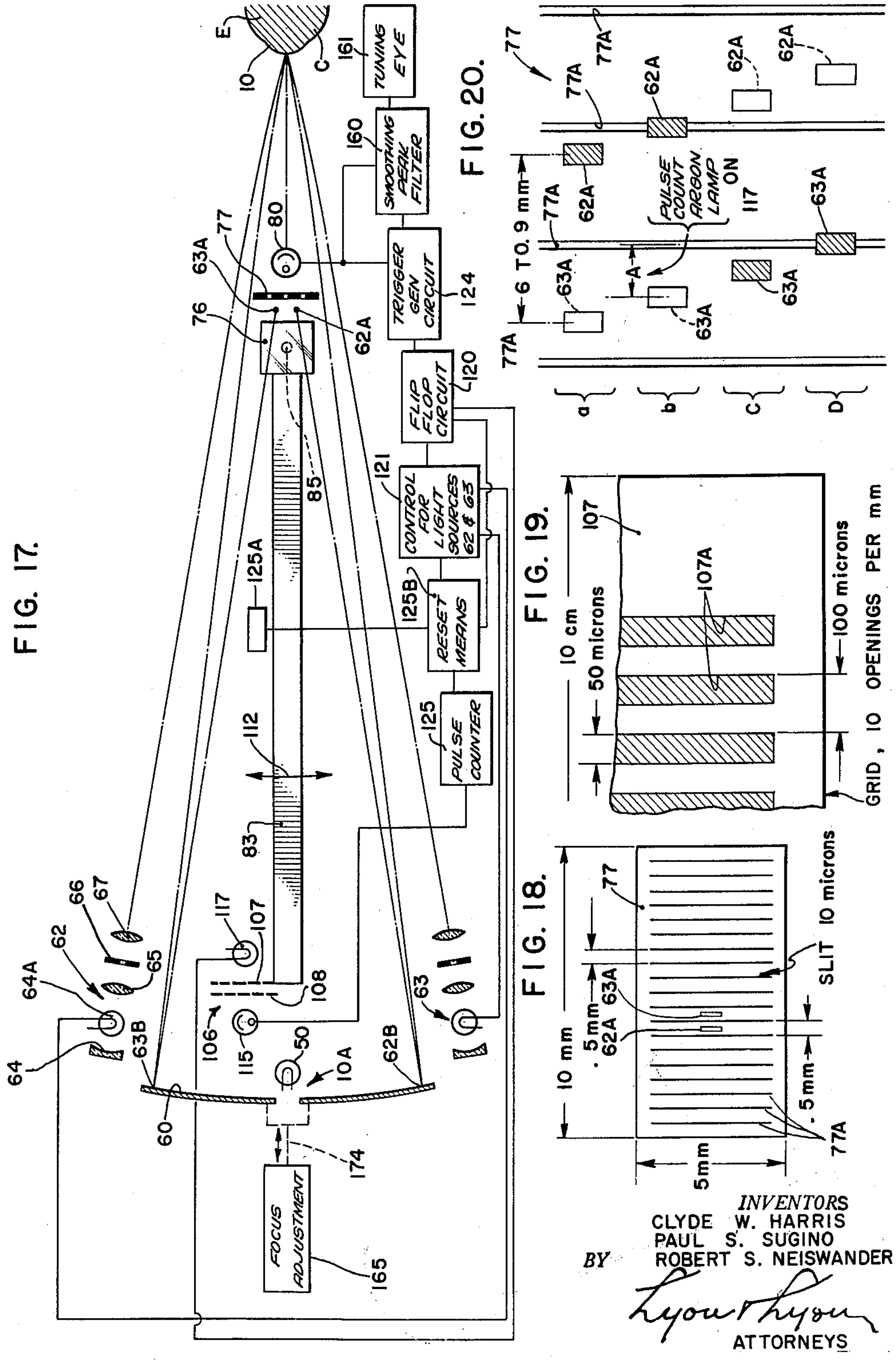
FIGURE 17 is generally a schematic representation in somewhat exaggerated form of the optical and electrical system for purposes of illustrating features of the present invention.
FIGURE 18 illustrates features of the fixed slit system in front of the first photocell in relationship to the images obtained by reflection from the corneal lens.
FIGURE 19 illustrates features of both the fixed and cooperating movable slit system in front of the second photocell used in obtaining electrical read-out.
FIGURE 20 illustrates the slit system in front of the photocell in relationship to movement of the two images shown in FIGURE 18, the hatching in FIGURE 20 indicating which one of the images is present at a particular time when and as the images are being moved relative to the fixed slit system by the oscillating prism shown in FIGURES 10 and 14.

This stationary slit system 77 is illustrated in FIGURE 18 in relationship to the two images 62A and 63A produced respectively by light sources 62 and 63 when energized. In FIGURE 18, the slit system 77 is formed from a thin sheet of metal having planar dimensions of approximately 5 mm. by 10 mm. with optical slits 77A photoetched therein, the slits having a width of approximately 10 microns and being equally spaced a distance of approximately one-half of a millimeter. The images 62A, 63A, referred to as an image pair or "floating pair," have a spacing dependent on the particular radius of the particular point on the cornea at which a measurement is being made and may, for example, be in the range of 6/10 to 9/10 of a millimeter as is also indicated in FIGURE 20. These images are caused to move with respect to the stationary slit system 77 by the oscillating prism 76 which may, for example, be of material having a refractive index of 1.5, with dimensions of 1½" long by ¾" x ¾" and with two optical parallel faces. The means whereby such prism 76 is oscillated is now described.

The prism 76 is mounted on a support 82 which in turn is mounted on one end of an oscillating arm or wand 83, the wand 83 being pivoted about the axis of a pin 85 which passes upwardly in FIGURE 10 through aligned apertured portions in wand 83 and supporting block 82 and which is affixed within the inner race of a bearing 87 having its outer race secured in bearing housing 88. This housing 88 is supported on a support frame 89 mounted on an inner wall of optical chamber 16. It will be observed that the prism 76 may thus be oscillated about an axis which passes centrally therethrough and which is generally perpendicular to the light beam passing therethrough.

Figure 9:
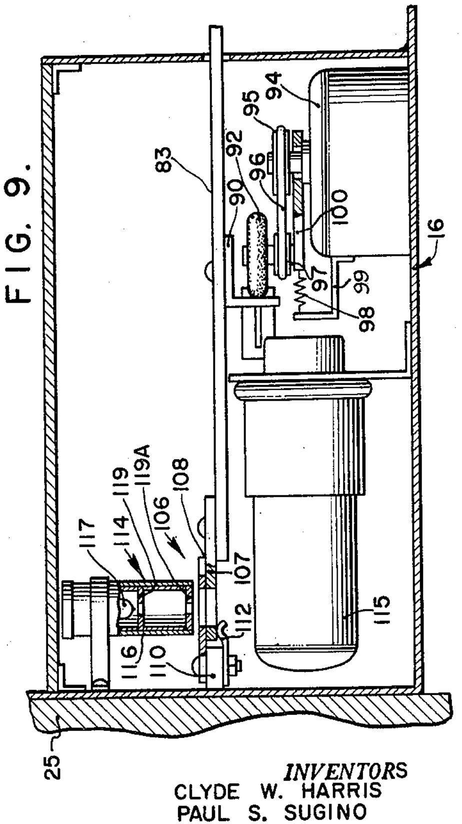
FIGURE 9 is a sectional view taken generally along the line 9—9 in FIGURE 4.

The other end of the wand, rod or arm 83, as shown in FIGURE 9, may be oscillated by conventional means as, for example, a conventional mechanism used in turning the turntable of a record phonograph. As illustrated, for these purposes the wand 83 has a short piece of angle iron stock material 90 (FIGURES 9 and 16) secured thereto which is constantly engaged by the rubber-rimmed driving puck 92. The puck 92 is driven by motor 94 mounted on the optical chamber 16, through motor shaft pulley 95, belt 96 and the floating pulley 97 to which the puck 92 is attached. A tension spring 98 between the motor bracket 99 and support 100 for pulley 97 and puck 92 serves to always maintain the puck 92 in driving relationship with the angle iron member 90, i.e. wand 83. The driving direction of motor 94 is automatically reversed at the ends of wand pivotal movement using conventional means illustrated herein in FIGURE 16 as a pair of limit or reversing switches 102, 103 in the form of so-called microswitches having actuating arms extending into the path of movement of corresponding ends of the angle iron member 90.

The other end of the wand 83 having much greater range of movement than the end on which the prism 76 is mounted has, as shown in FIGURES 9 and 15, a portion of a light switch 106 mounted thereon for achieving a read-out function. This light switch 106 comprises two like optical slit members 107 and 108, the member 107 being secured to one end of wand 83 to move therewith and the other member 108 being stationarily mounted on a bracket 110 on optical chamber 16. The movable slit member 107 is guided in a channel defined by the stationary slit member 108 and an arm 112 extending from bracket 110. This light switch 107, 108 is interposed between a light source 114 controlled by photocell 80 (FIGURE 10) and a second photocell 115 for operating a digital counter in a manner described later.

The construction of light switch 107, 108 is exemplified in FIGURE 19 by referring to the dimensions of element 107, it being understood that element 108 is identical with element 107. The element 107 may have a width of 10 centimeters and has a series of equally spaced slits 107A therein, each having a width of 50 microns and with the spacing between slits being the same, namely 50 microns. This arrangement of slits 107, 108 thus provides a light shutter which allows either transmission of light or prevents transmission of light, depending on relative positioning of elements 107, 108. The light source 114 cooperating therewith comprises a housing 116 on the optical chamber 16 containing an argon lamp 117 in optical alignment with a pair of spaced light stops 119, 119A each having a 1 mm. central aperture therein.

Operation of the system in making a single radius measurement is now described with respect to FIGURES 17 and 20 which are largely schematic showing the relationship of elements in exaggerated form for purposes of explanation.

It is recalled that only one of the orientation or fixation light sources 10A, 11A, 12A, 13A, 14A (FIGURE 4) is energized at any one particular time and that the patient orients his eye on that particular illuminated light source so that a corresponding one of the measuring points illustrated in FIGURES 11 and 12 is established. It is thus assumed that the light source 10A comprising lamp bulb 50 is energized and the point 10 in either FIGURE 11 or FIGURE 12 is established. Also, the wand 83 carrying the prism 76 is oscillating in the directions indicated by the arrows 112 about the pivot axis 85. The light from source 62, when illuminated, produces a convergent light beam which is first reflected from the point 10 on the cornea from where it is reflected onto the spherical mirror 60 from where it in turn is reflected onto the prism 76 and a focused image of the slit in source 62 appears as the image 62A (FIGURES 17 and 18) at the slit system 77. Likewise, the light from source 63, when illuminated, produces a convergent light beam which is first reflected from the same point 10 on the cornea from where it is reflected onto the spherical mirror 60 from where it in turn is reflected onto the prism 76 and a focused image of the slit in source 63 appears as the image 63A (FIGURES 17 and 18) at the slit system 77. Only one of such illuminated images 62A, 63A is produced at one particular time as indicated by the hatching in FIGURE 20, the light sources 62 and 63 being automatically switched on and off, as described later, due to operation of the photocell 80 and the multivibrator circuit 120 connected thereto.

Assuming that condition illustrated at *a* in FIGURE 20 exists, i.e. source 62 is illuminated, source 63 is dark and the bright focused slit image 62A appears between slits 77A which means that the photocell 80 is not illuminated at this time. Light source 62 continues to remain illuminated and source 63 remains dark until the moving prism 76 shifts the image 62A to the position indicated at *b* in FIGURE 20, at which time source 62 is extinguished and source 63 is illuminated. Further movement of the prism is indicated at *c* in FIGURE 20 showing the illuminated image 63A and now dark (no image) 62A. Still further movement of the prism 76 in the same direction results in the condition shown at *d* in FIGURE 20 wherein the illuminated image 63A is transmitted through a slit 77A in slit system 77 to illuminate the photocell 80 to extinguish light source 63 and illuminate source 62 to again achieve the condition represented at *a* in FIGURE 20.

This alternate switching on and off of source 62 and 63 in response to successive light impulses received by photocell 80 is accomplished by operation of a flip-flop or multivibrator circuit 120 having two states of operation. In one of the two states the control circuit 121 responsive to such one state energizes the source 62 and maintains the other source 63 de-energized, and in the other one of the two states the control circuit 121 responsive to such other state energizes source 63 and maintains the other source 62 de-energized. When source 63 is illuminated, the argon lamp 117 in the pulse counting circuit is also simultaneously illuminated and is de-energized when source 63 is de-energized. For this purpose the argon lamp, requiring a small amount of current, may be connected to one of the anodes of a conventional multivibrator. The flip-flop circuit 120 for these purposes is controlled by electrical impulses developed in the photocell, such impulses being coupled to a trigger generating circuit or blocking oscillator stage 124 and the output of stage 124 is coupled to the flip-flop circuit to operate the same for these purposes. Preferably the trigger generator stage 124 requires, for its operation, a signal from photocell 80 having an intensity above a predetermined threshold value for increased accuracy and for reasons mentioned later.

Thus, as indicated by the dimension A in FIGURE 20, the argon lamp 117 for pulse counting purposes is illuminated when illuminated image 62A is in registry with one of the slits 77A and during that range of prism movement corresponding to the distance between the then illuminated image 63A and the next slit 77A which is being approached by image 63A. This distance corresponds to the relative spacing between images 62A and 63A, i.e. to the particular radius at point 10 (FIGURE 11) being measured.

Figures 2, 3:
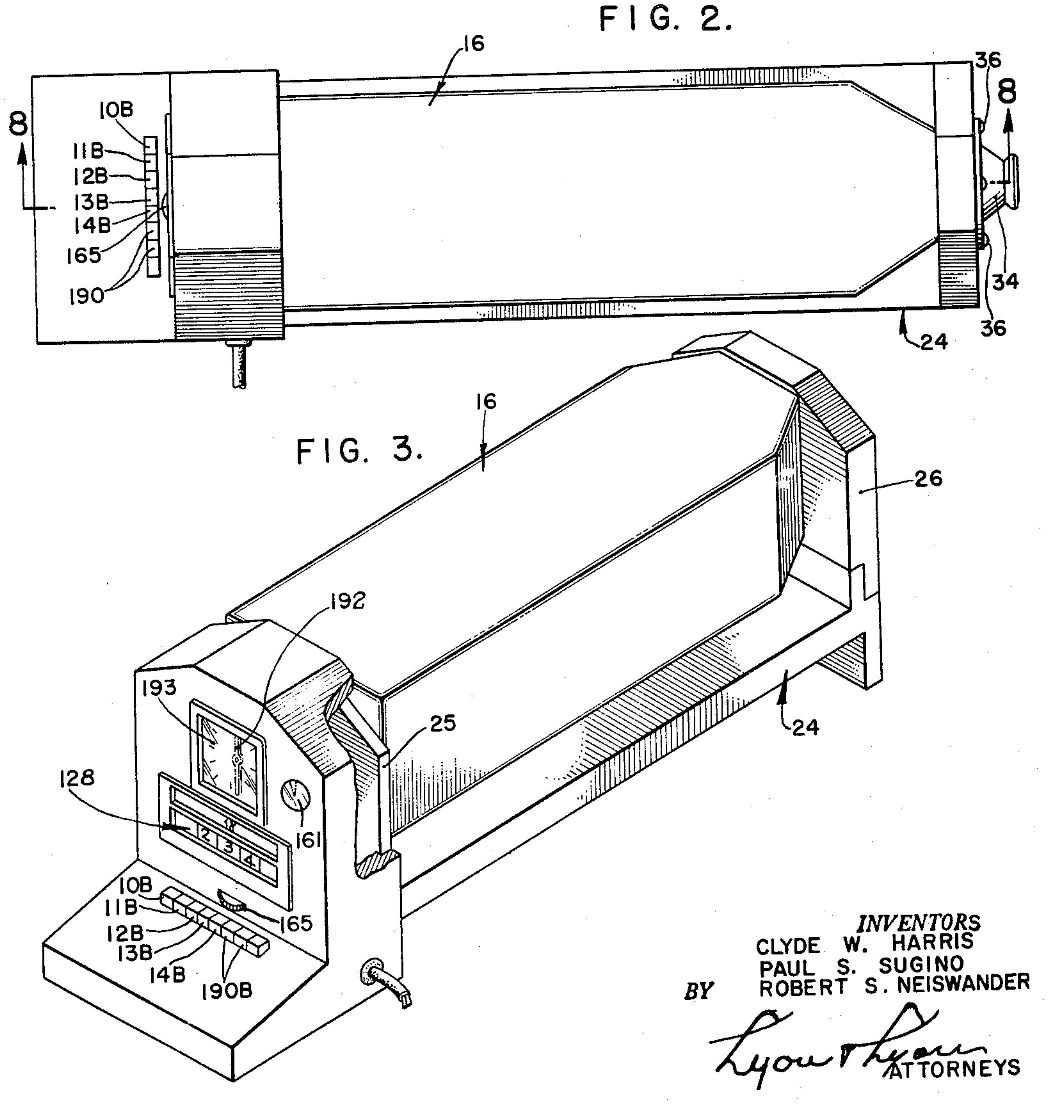
FIGURE 3 is a perspective view of the same.

For these pulse counting purposes, the photocell 115, delivering impulses when and as the movable grid 107 moves relative to the fixed grid 108, is coupled in conventional manner to a conventional pulse counter circuit 125 which produces a visual display or reading of the number of such pulses on the indicator 128 (FIGURES 3 and 13). This reading is directly proportional to the radius being measured.

In accomplishing these results, the prism 76 is oscillated through a total angle of approximately 5°, i.e. 2½° each side of center. This corresponds to a one-half millimeter movement of the floating image pair 62A, 63A, a distance comparable to the spacing between slits 77A (FIGURE 18). The particular drive used for the prism is not critical since the measurements are not based on a factor of time but on distance, although preferably the prism is displaced an angular distance in linear proportional to time. It will also be appreciated that the particular speed of movement of the prism is not critical but should be slow enough to allow the pulse counter 125 to complete its count in one excursion of the prism.

It will also be understood that while the prism 76 continuously oscillates, the pulse counter 125 performs its function of counting after which the same is reset. Resetting of the three digital counter 125 is preferably accomplished using a limit switch operated by the wand 83 at the end of one of its excursions such as a switch 125A (FIGURE 17) provided by available contacts in the microswitch 102 (FIGURE 16), such switch 125A controlling the counter reset means 125B so that the counter 125 is reset after the operator has had sufficient time to note the reading on counter 125. The reset signal developed in reset means 125B may also be applied to the flip-flop circuit 120 to assure its proper operating condition for starting the next count.

It will be noted that the above description presupposes that at the beginning of operations, no portion of the image 62A was in registry with a slit 77A and suitable measurements may be made when such initial condition exists. However, one of the reasons for providing the slit plate 77 is to compensate for any errors which may otherwise be introduced by the different size lenses (corneas) being measured and their relative positions in the eye piece 34 of the instrument; and in such case the pair of images 62A, 63A has more or less an arbitrary location with respect to any particular slit 77A in the slit plate. Thus, preferably it is desirable to provide some means for providing the following three functions: (*a*) for identifying each of the images 62A, 63A; (*b*) for preventing an image that happened to be in one of the slits 77A, at the start, from producing an erroneous count and (*c*) for assuring the production of one and only one measurement during a measurement cycle. These functions are accomplished in the arrangements described herein with particular reference to FIGURE 21 which illustrates in more detail the circuitry responsive to illumination impinging on photocell 80 as explained later.

With respect to function (*a*) above, this is achieved by always having source 62 for the first image 62A on at the initiation of the problem cycle and source 63 off. When image 62A crosses a slit 77A and the measurement count is started, image light 63 is turned on and image light 62 is turned off. This sequencing provides positive identification for count start and stop.

With respect to function (*b*) above, since the images 62A, 63A are large compared to the linear accuracy of measurement of image separation, if the count were to start whenever image 62A initially appeared in a slit 77A, instead of as in the condition shown in FIGURE 20(*a*), the start error would be large. It is desirable to minimize such error. This is accomplished by utilizing the trailing edge of the image pulse rather than the peak or the leading edge. The Gaussian-shaped image pulse produced in photocell 80 in FIGURE 21 and amplified in its amplifier 80A is applied to the Schmidt-type trigger generator 124 which has a square pulse output. No matter where the image 62A lies in the slit (originally or later), the trailing edge of the square pulse supplied by trigger generator 124 is an accurate position reference and is used in initiating operation of the flip-flop circuit 120.

The assurance of the third function, namely function (*c*) above, i.e., the guarantee of one and only one measurement is obtained by a simple logic circuit (FIGURE 21) that blocks the output to the counter lamp 117 after one count measurement; and this block is removed by the reset for a new cycle. Thus, in FIGURE 21, the circuit that accomplishes the same is illustrated with the switch contacts in the normally de-energized condition. Two relays are included, namely a first relay having one terminal of its winding 140 connected to an output circuit of flip-flop 120 and the other one of its terminals grounded. When winding 140 is energized by the flip-flop 120, the associated relay switches 140A, 140B are closed and relay switch 140C is opened. The second relay has the energizing winding 142 which has one of its terminals grounded and the other one of its terminals connected through normally open relay switch 140A to the same output circuit of flip-flop circuit 120. When winding 142 is energized, its associated relay switches 142A and 142B are closed. It is noted that relay switch 140A shunts a series circuit which includes the serially connected relay switch 142B and reset switch 145 and that the single pole double throw relay switch 140B, 140C alternately connects the light sources 62, 63 respectively to their energizing source 146 to alternately illuminate the same.

Just before the measurement cycle begins, the flip-flop circuit 120 is in reference condition off, i.e., a voltage of approximately 50 volts appears on the output lead 120A to energize relay winding 140, in which case the other relay winding 142 is also energized through relay switch 140A to in turn ground the other flip-flop output lead 120B so that zero voltage is applied to the counter light circuit 117. Also, at this time relay switch 140B is closed to energize the source 62 and image 62A appears; and also a holding circuit for relay winding 142 is established through relay switch 142B and reset switch 145 operated by the oscillating wand 83.

The cycle begins with a brief opening of the reset switch 145 which is maintained open just sufficiently long to coincide, in time, with opening of relay switch 140A when the trailing edge of the first pulse from trigger generator 124 reverses the flip-flop and causes winding 140 to be de-energized, i.e., to cause switch 140A to open. At this particular instant both switches 140A and 145 are open and winding 142 is de-energized to allow switch 142A to open, thereby removing the ground from lead 120B. At the same time the measurement count is initiated, the image light 63 is illuminated. The wand continues its movement to, in effect, move the second image 63A and when the trailing edge of the pulse produced thereby occurs, the flip-flop 120 is returned to its initial state to again energize winding 140 and in turn energize winding 142 through the now closed relay switch 140A to in turn ground the counter light line 120B through switch 142A, thereby stopping the count. Relay winding 142 remains energized also through its holding switch 142B and reset switch 145 to prevent further action of the flip-flop 120 until the wand-operated reset switch 145 again starts a counting cycle.

Figure 23:
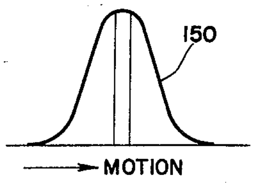
Figure 23A:
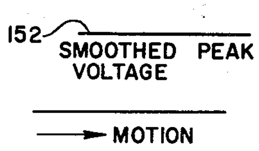
Figure 25:
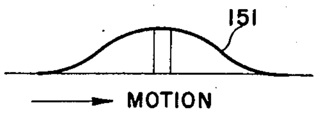
Figure 25A:
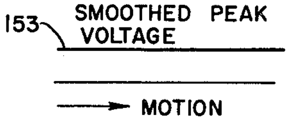

Another feature of the invention is the incorporation of a focus control for the images 62A and 63A for purposes of enhancing the accuracy of the system by, in general, decreasing the length and increasing the amplitude of the electrical signals produced thereby as discussed now in connection with FIGURES 22–25. FIGURES 22 and 24 represent respectively the conditions of a focused image 62A and an unfocused image with respect to the size of slit 77A. FIGURES 23 and 25 represent the size and shape of the corresponding pulses 150, 151 developed by the photocell 80 in relationship to the slit width and the corresponding horizontal lines 152 and 153 which represent the smoothed peak voltage developed in the smoothing peak filter 160 (FIGURE 17). This voltage represented by 152 and 153 is indicated by a tuning eye type detector 161 which may be located on the front of the instrument as shown in FIGURE 3. Means operated by a knob 165 (FIGURE 3) is used to maximize the voltage 152 which is indicated on tuning or focusing eye 161. These means are now described in connection with FIGURES 8 and 5. The knob 165 is operatively connected through a suitable motion transfer device 170 to the inner wire 171 of a Bowden cable 172, which wire is fastened as shown in FIGURE 5 to a screw-threaded member 174 threaded in the stationary bracket member 176. This member 174 has an enlarged head 174A fitted in a cavity 178 in the carriage 58 so that rotation of the wire 171 causes rectilinear movement of carriage 58 which is guided by its attached guide rods 180, 181 slidably mounted in bracket member 176. This adjusts the position of mirror 60 to adjust the focus of image 62A on slit 77A. Correct focus adjustment is indicated by a maximum reading of voltage 152 on tuning eye 161 and this adjustment is effected prior to the first of the series of measurements.

While the above detailed discussion has been made with respect to one measurement, the apparatus is capable of making the other nine measurements indicated in FIGURES 11 and 12 by indexing the rotatable drum 16 to its two positions and selectively energizing the orientation lamps 10A–14A. For example, five pushbutton switches 10B–14B on the front of the instrument may be used to turn on a corresponding orientation lamp 10A–14A. The series of pushbutton switches 190 may be used to index the drum 16 whose orientation is indicated by pointer 192 cooperating with the fixed scale 193. Any suitable means, electrically operated, may be used for rotating the drum 16 or the same, if desired, may be manually rotated in its bearings. Preferably the drum is rotated by an electrical motor controlled by adjustable limit switches which serve to de-energize the motor to arrest movement of the drum 16 when the same has been moved to a predetermined adjustable position. The two limit switches may be mounted spatially 90° apart on an adjustable support which, when once adjusted, establish the end points of movement of drum 16.

It will be seen from the foregoing that means are provided for making a series of radius readings readable on the digital counter 128 in a relatively short period of time by unskilled personnel. While the numbers read on counter 128 are indicative of radius, the same may be calibrated in terms of true radius and the numbers themselves may serve as the prescription for a contact lens.

The prescription of a contact lens manufactured in accordance with the prescription may be checked using a slight modification in the optical system as now described in connection with FIGURE 26. The problem involves then not measuring radii of a convex object (cornea) but of a concave object. For this purpose, first the sequence of operation of light sources 62 and 63 is reversed and secondly the beams produced by these light sources are changed, as indicated in exaggerated form in FIGURE 26, to converge in front of the concave object instead of behind the convex object; otherwise the apparatus and its functioning is as described above.

In a system as described, the wand 83 may have, for example, a total length of 100 centimeters oscillating through an angle of approximately one-tenth of a radian which is generally a compromise between accuracy and the distance between points of light beam impingement on the cornea so that the readings on the counter comprise three digits. While the beams from sources 62 and 63 converge some distance beyond the cornea, the distances and geometry are such that the separation of the beams from these two sources where they impinge on the cornea are relatively small in comparison to the distance between the measuring points shown in FIGURES 11 and 12. For these purposes the mirror 60 may have a diameter of approximately two inches with a focus of approximately 50 centimeters.

While the particular embodiments of the present invention has been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A radius measuring system for determining the radius of the cornea of an eye including: eye positioning means comprising an eyepiece; a rotatable optical chamber indexable into two quadrature positions and carrying said eyepiece with the axis of the eyepiece corresponding to the rotational axis of said chamber; a plurality of alignment light sources mounted in said chamber for projecting light beams at corresponding different angles into said eyepiece whereby a patient's eye may be indexed with respect thereto; means for selectively energizing one of said plurality of light sources; a pair of light sources, separate from said plurality of light sources, mounted in said chamber for projecting light beams into said eyepiece and for obtaining reflections from the cornea positioned in said eyepiece with the spacing of said reflections being representative of curvature of the cornea; an optical slit element stationarily mounted in said chamber; first photocell means stationarily mounted in said chamber behind said optical slit element; light reflecting means stationarily mounted in said chamber for reflecting that light originating from said pair of light sources and reflected by the cornea onto said slit element; an oscillating member mounted in said chamber; light prism means mounted on said oscillating element between said light reflecting means and the front of said slit element; light gate means comprising a pair of optical slit members each having light-apertured portions of substantially the same size, one of said light slit members being stationarily mounted in said chamber and the other one of said slit members being mounted on said oscillating member; a counting light source mounted on one side of said light gate; second photocell means mounted on the other side of said light gate; electric pulse generating means coupled to said first photocell means for developing electrical pulses in accordance with oscillation of said oscillating member; means controlled by said pulse generating means for alternately rendering one of said pair of light sources alternately effective and the other one of said pair of light sources ineffective in accordance with succeeding pulses developed in said pulse generating means; pulse counter means coupled to said second photocell means; and means coupling said counting light to said pulse generating means.

2. In a radius measuring system for measuring the radius of an object of the character described including: a slit element; photocell means mounted behind said slit element; a pair of light sources each alternately effective to produce focused images on said slit element after reflection from said object with the spacing of said images being representative of the curvature of said object; means for moving said images with respect to said slit element to energize said photocell means in accordance with movement of said images; pulse generating means coupled to said photocell means for producing pulses in accordance with said images; means alternately switching off one of said pair of light sources and switching on the other one of said sources, said means being controlled by said photocell means; light gate means operated synchronously with movement of said images; second photocell means positioned on one side of said light gate means; a counting light mounted on the other side of said light gate means; and means coupling said counting light to said pulse generating means.

3. In a system of the character described for measuring the curvature of an object including: means for positioning said object; a pair of light sources each alternately effective to produce reflected light from said object; a slit element in the path of said reflected light and receiving focused images from said light sources thereon with the spacing of said images being representative of said curvature of said object; first photocell means positioned behind said slit element receiving reflected light transmitted through said slit element; means for moving said focused images with respect to said slit element; pulse generating means coupled to said photocell means; means coupled to said pulse generating means for alternately rendering one of said pair of light sources effective and the other one of said sources ineffective; light gate means controlled by said moving means; second photocell means positioned on one side of said light gate means; a counting light mounted on the other side of said light gate means; a pulse counter coupled to said second photocell means; and means coupled between said counting light and said pulse generating means for alternately energizing and de-energizing said counting light.

4. In a system of the character described for determining curvature of an object including: a pair of light sources each alternately effective to produce reflected light from said object; a slit element; light reflecting means for reflecting that light reflected from the object onto said slit element; said light sources producing focused images on said slit element with the spacing between said images being representative of said curvature of said object; means for moving said images with respect to said slit element; first photocell means behind said slit element and energized in accordance with light transmitted through said slit element; light gate means synchronously operated with said moving means; second photocell means being positioned on one side of said light gate means; a counting light mounted on the other side of said light gate means; pulse counting means coupled to said second photocell means; pulse generating means coupled to said first photocell means; means coupled to said pulse generating means for alternately energizing one of said pair of light sources and for de-energizing the other one of said pair of light sources; and means coupling said pulse generating means to said counting light for alternately energizing and de-energizing said counting light in accordance with said pulse generating means.

5. A system as set forth in claim 4 in which said reflecting means is adjustable to adjust the focusing of said images on said slit element; and means coupled to said first photocell means for indicating the focused condition of said images.

6. A system as set forth in claim 5 including a plurality of light sources each directing a light beam onto said object at different angles for alignment of said object, and means for selectively energizing different ones of said plurality of light sources.

7. A system as set forth in claim 6 in which said image-moving means comprises a light prism disposed between said reflecting means and said slit element; said prism being mounted on an oscillating wand which oscillates about an axis passing through said prism; said light gate means comprising a pair of slit elements, one of which is stationary and the other one of which is mounted on said wand; and reset means operated by movement of said wand for resetting said pulse counter.

8. A system as set forth in claim 7 in which said pair of light sources, said plurality of light sources, said slit element and said wand are mounted in a rotatable optical chamber.

9. A system as set forth in claim 8 including means for indicating the position of said optical chamber.

10. A system as set forth in claim 9 in which manually operable means are provided to adjust the position of said reflecting means.

11. A system as set forth in claim 4 in which said pair of light sources produces beams of light which converge beyond the reflected points on said object.

12. A system as set forth in claim 4 in which said pair of light sources produces beams which converge at a point in front of the light reflected points on said object.

13. In a system of the character described for determining curvature of an object, a pair of optical means each effective to produce a corresponding reflected light image from said object with the spacing between the image produced by one of said optical means and the image produced by the other of said optical means being representative of the curvature of said object, means moving said images, means controlled by said moving means and said images for alternately rendering one of said pair of optical means ineffective and the other one of said optical means effective to produce a corresponding one of said images, and means operated by said moving means and controlled in response to said images for indicating the spacing between said images.

14. A system as set forth in claim 13 in which said means controlled by said moving means includes electrical pulse generating means for developing a pair of pulses each in accordance with a corresponding image, and said indicating means includes electrical pulse generating means for developing a multitude of pulses depending on the spacing between said pair of images.

15. In a system of the character described for determining curvature of an object; a pair of optical means for producing light impinging on said object at different angles and producing a corresponding pair of spaced reflected light images from said object with the spacing of said images being representative of said curvature of said object; means determining the spacing between said images; said determining means including: image reference means; image moving means producing movement of said images with respect to said reference means; means operated when said images are moved into registry with said reference means for alternatively rendering one of said optical means effective and the other one of said optical means ineffective to produce a corresponding one of said images; and distance measuring means operated by said moving means and controlled by said image-operated means for determining the spacing between said images.

16. A system as set forth in claim 15 in which said image-operated means includes an electrical pulse generator and said distance measuring means comprises an electrical counter.

17. A system as set forth in claim 16 including means operated by said image-moving means for resetting said counter.

References Cited by the Examiner

UNITED STATES PATENTS

| | | | |
|---|---|---|---|
| 2,733,634 | 2/56 | Littmann et al. | 88—20 |
| 2,954,266 | 9/60 | Danielson et al. | 88—14 |
| 2,977,841 | 4/61 | Kaufmann et al. | 88—14 |
| 3,136,839 | 6/64 | Safir | 88—20 X |

JEWELL H. PEDERSEN, *Primary Examiner.*

EMIL G. ANDERSON, *Examiner.*